United States Patent [19]
Pechstein

[11] 3,894,565

[45] July 15, 1975

[54] TEMPLE ROLLER DEVICE

[75] Inventor: Walter Pechstein, Hinwil, Switzerland

[73] Assignee: Ruti Machinery Works Ltd., Ruti, Zurich, Switzerland

[22] Filed: Oct. 26, 1973

[21] Appl. No.: 410,219

[52] U.S. Cl. .............................. 139/296; 139/297
[51] Int. Cl. .............................................. D03j 1/22
[58] Field of Search .................... 139/292, 294–297

[56] References Cited
FOREIGN PATENTS OR APPLICATIONS

| 210,477 | 2/1924 | United Kingdom ................. 139/297 |
| 585,577 | 11/1958 | Italy .................................... 139/296 |
| 264,665 | 1/1927 | United Kingdom ................. 139/294 |
| 10,230 | 1890 | United Kingdom ................. 139/297 |

*Primary Examiner*—James Kee Chi
*Attorney, Agent, or Firm*—Donald D. Denton

[57] ABSTRACT

A temple roller device for use on a loom for weaving cloth having a support rod with a flattened portion extending in its longitudinal direction and an aperture in each of a plurality of bearings with flanges thereon, each bearing supporting a small wheel, and in which the bearing aperture has a "bulge" at the location of the flattened portion which is aligned with that one of two locations at which, if the aperture is assumed to be round, in consequence of the oblique position thereof, the thickness of the bearing is a minimum, and which is located at the end of the bearing opposite the flange.

6 Claims, 3 Drawing Figures

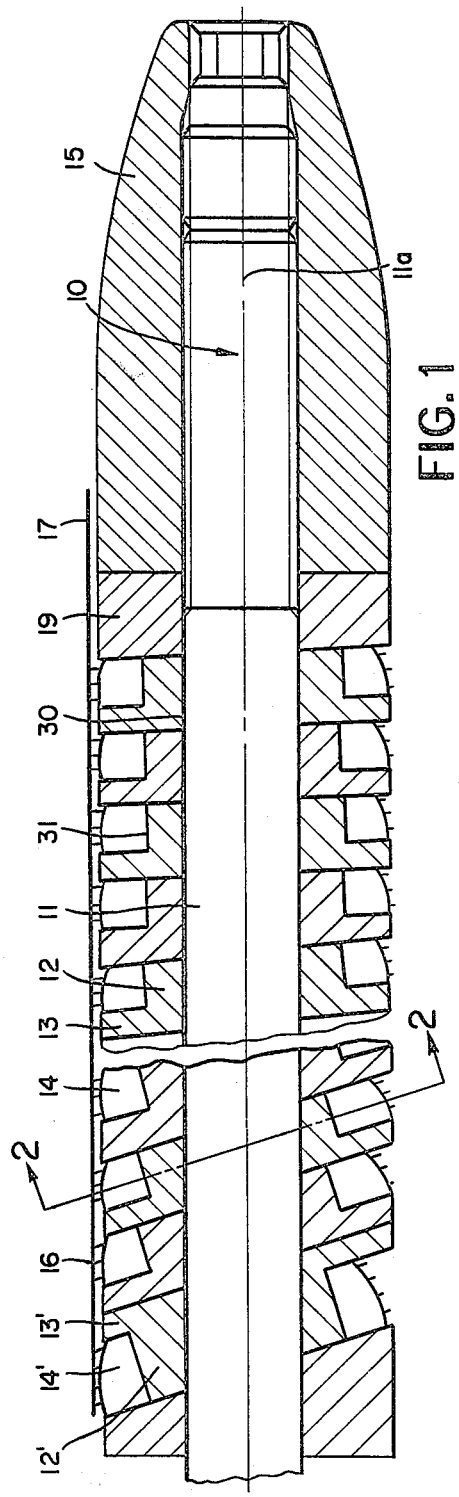
FIG. 1
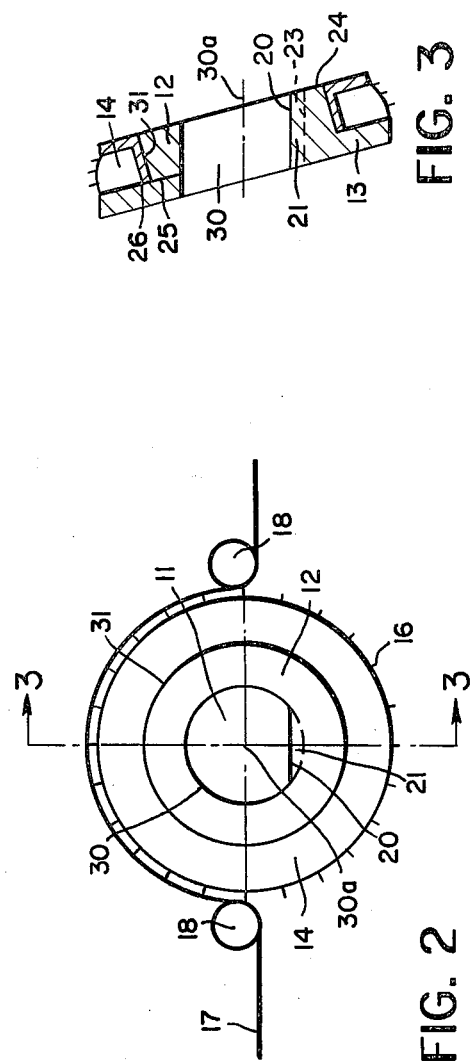
FIG. 3
FIG. 2

TEMPLE ROLLER DEVICE

BACKGROUND

The present invention relates to a temple roller device having a plurality of small wheels each of which is mounted for rotation on a circular-cylindrical bearing face of a bearing; each bearing is flanged on one side and is formed with an aperture extending through the bearing and the flange thereof, through which said aperture a support rod is pushed, so that the bearings are aligned juxtaposed along the said support rod, and, in order to arrange the bearings and small wheels obliquely relative to the longitudinal axis of the support rod, the apertures are oblique relative to the circular-cylindrical bearing faces.

Temple rollers of this kind have the disadvantage that they tend to be distorted due both to their construction and to the tension in the woven cloth on the temple rollers.

The closest prior art known to the applicant in connection with the invention presented in this application for Letters Patent is in; U.S. Pat. No. 2,666,457; U.S. Pat. No. 2,972,361.

SUMMARY

The present invention obviates the disadvantage discussed above. The said invention is characterized in that the support rod has a flattened portion extending in its longitudinal direction and an aperture in each bearing and its flange that "bulges" at the location of the flattened portion, the flattened portion being aligned with that one of the two locations at which, if the aperture is assumed to be round, in consequence of the oblique position thereof the thickness of the bearing is a minimum, and which is located at the end of the bearing opposite the flange.

BRIEF DESCRIPTION OF THE DRAWINGS

These and other advantages of the invention will become apparent from the detailed discussion of examples of preferred embodiments and with reference to the drawings, in which:

FIG. 1 is a longitudinal view in section through a temple roller device of this invention;

FIG. 2 is a section taken along the line 2—2 of FIG. 1; and

FIG. 3 is a section along the line 3—3 of FIG. 2 without the support rod being shown.

DESCRIPTION OF PREFERRED EMBODIMENTS

In all the figures, like elements have been given the same reference numerals.

The temple roller device or temple 10 illustrated in FIGS. 1 and 2 has a support rod 11 having a longitudinal axis 11a onto which a plurality of bearings 12 is pushed and positioned, being aligned along the said support rod. Each bearing 12 is provided with a flange 13 and mounted for rotation on each bearing 12 is a small wheel 14. Inserted into the face of small wheels 14 are spikes 16, serving for retaining the cloth 17. Instead of spiked wheels (porcupine wheels), it is also possible to provide rubber wheels or the like. The cloth 17 travels through the device on the upper side thereof. The deflecting members 18 arranged on both sides of the temple roller device 10 also constitute parts of the temple (see FIG. 2). The right-hand end of the temple roller device 10 is the free end thereof. At its other end, it is secured to a loom (not shown). By means of a closure head means 15, the bearings 12 having flanges 13 (ellipses) are compressed via clamping washer means 19 (see FIG. 1).

The bearings 12 and the small wheels 14 are arranged obliquely relative to the longitudinal direction of the support rod 11. For this purpose, each bearing 12 is, together with its flange 13, formed with an aperture 30 having a horizontal centerline 30a extending obliquely relative to the circular-cylindrical bearing face 31 of the bearing 12. As can be seen from FIGS. 1 and 2 of the drawings, the centerline 30a corresponds to centerline 11a of the support rod 11. Thus, each bearing face extends obliquely relative to the centerlines 11a and 30a. The degree of inclination increases in the direction away from the free end of the temple roller device. Due to this arrangement, the result is achieved that the outwardly directed pull on the cloth is of equal value over the entire length of the temple. Thereby, any possiblity of the temple exerting a harmful effect on the cloth is practically eliminated.

FIG. 2 shows the manner in which the support rod 11 is flattened in the longitudinal direction. The flattened portion has been given the reference numeral 20. Correspondingly, the cross-section of the aperture 30 formed in the bearing 12 and its flange 13 is not completely circular, but the aperture has a raised portion or "bulge" 21 which fits into the flattened space and corresponds to the flattened portion 20 of the support rod. This means that, at that location at which the flattened portion 20 is formed on the support rod 11, the bearing 12 and its flange 13 has a zone 21 which deviates from circular shape. The apertures 30 in the bearings 12 and flanges 13 have a shape such that they bear on the support rod 11 over their entire inner periphery.

In explanation of the features and advantages resulting due to the flattened portion 20 of the support rod 11 and due to the inner raised portion or "bulge" 21 on the bearings 12 and their flanges 13, reference will be made to FIG. 3. The support rod 11 is not shown in FIG. 3. If the cross-section of the support rod 11 and the apertures 30 in the bearings 12 were to be circular, as shown in dot-dash lines in FIG. 3, then there would be delimiting portions of the bearing apertures such as are indicated by the lines 22, 23 in FIG. 3. Due to the flattening of the support rod 11, the lower portion of the bearing 12 has more material. With a circular bore to correspond to the line 23, tightening of the closure head means 15 may cause distortion of the rod 11 in the downward direction. Additionally, the tensioned cloth 17 amplifies this distortion tendency. If the aperture 30 arranged to extend obliquely in the bearing 12 and its flange 13 is designed as a round bore, so that the size thereof is determined by the straight lines 22, 23, then there are produced the two locations 24, 25 at which the thickness of the bearing wall is a minimum. The cause of the distortion just mentioned resides in the fact that relatively little material is available at the location 24. The thin location 25 is less detrimental because it coincides with the flange 13 and this corresponds to a reinforcement of the location 25. Reinforcement at the location 24 is according to the present invention, achieved in that the support rod 11 is flattened as far as the face 20 and provision is made for corresponding shaping of the bearing 12, that is for thickening of "bulging" 21 of the wall of the bearing 12. The raised portion extends as far as the flattened portion 20. It should be noted that there is very much less risk of distortion of the support rod 11 in the upward direction, because the tension of the cloth 17 acts in the opposite direction. In order that the bearings 12 and their flanges 13 may possess the necessary degree of precision and may not require a costly machining process, they are advantageously manufactured by sintering.

Due to the mode of manufacturing the support rod 11 and the bearings 12 as described hereinabove, not only is distortion of the support rod 11 prevented but, additionally, there are achieved the following advantages: Depending on the cloth to be manufactured, various porcupine wheels 14 or also rubber wheels are employed. These are, as a rule, also changed on changing from one weave to a different weave, that is, they are adapted to the weave. In the case of temples wherein the bearings 12 having the small wheels 14 have unequal oblique positions and wherein the rod 11 and the apertures 13 in the bearings 12 and their flanges 13 have circular cross-section, it may happen that one or other of the bearings 12 is, despite the fact that extreme care has been taken, clamped in position in somewhat distorted manner, so that such bearings do not bear uniformly at their adjacent bearings; thereby, jamming of the small wheels 14 may take place. Due to the circular cross-section, it may, furthermore, be difficult to find the correct sequence of the bearings 12, because a small degree of rotation will readily give rise to the false impression that a bearing 12 has, with its small wheels 14, been introduced in the correct sequence. Due to the flattened portion 20 of the rod 11 and the corresponding shaping shown at 21 of the bearings 12 and their flanges 13, it becomes impossible to provide a false rotational position, whereby arrangement in the correct sequence is very considerably facilitated.

FIG. 3 differs from the example shown in FIGS. 1 and 2 to the extent that supplementary plastic sleeves 26, on which the small wheels 14 are mounted, are provided. With this arrangement, the small wheels 14 rotate with the plastic sleeves 26.

It would also be possible to envisage the possibility of attaching the flanges 13 on the right-hand side of the bearings 12. In this case, each of the small wheels 14, or, if the latter were (as shown in FIG. 3) to be assembled with a plastic sleeve 26, the said plastic sleeve 26, would be pressed against the side of the flange 13 bearing against the bearings 12. However, this side cannot be machined to afford an absolutely smooth surface as readily as in the case of the other side (the left-hand side in FIG. 3) of the flange 13, at which there are no projecting parts. Thus, the example of embodiment shown has the advantage that the small wheels 14 which of course (with reference to FIGS. 1 and 3) are pressed towards the right by the cloth 17, travel on a surface of maximum smoothness, and thus consequently with a minimum frictional effect.

Referring to FIG. 1, there is disposed at the left-hand end, serving for securing the temple roller device, a bearing 12' provided with a flange 13'. The selvedge of the cloth 17 travels over the corresponding wheel 14'. Since the position of the selvedge during weaving is not always precisely at the same location, this small wheel 14' must be made wider than the remaining small wheels 14. Thereby, also the bearing 12' is wider than the remaining bearings 12. The consequence of this is, again, that the locations 24 and 25 shown in FIG. 3 are, in the case of the end bearings 12', still thinner than in the case of the other bearings 12. It has been found that, taking all circumstances into consideration, the best design is such whereby at the end bearing 12' the flange 13' thereof is disposed on that end of the end bearing 12' which faces the free end of the temple roller. Additionally, it may be advantageous to shift the bearing 12', by appropriate eccentricity of its aperture, somewhat upwardly, that is towards that zone in which cloth contact takes place.

It will be appreciated that various changes and modifications may be made within the skill of the art without departing from the spirit and scope of the invention illustrated and described herein.

What is claimed is:

1. A temple roller device for use on a loom for weaving cloth, having a plurality of small wheels each mounted for rotation on a circular-cylindrical bearing face of a bearing, each bearing being flanged on one side and having a circular aperture extending completely through the bearing and its flange, through which aperture a support rod of circular cross-section is positioned, so that the bearings are aligned juxtaposed along the said support rod, the circular-cylindrical bearing face of each bearing arranged obliquely to the centerline of said aperture in order to arrange each of the bearing faces and the small wheels obliquely relative to the longitudinal axis of said support rod, said support rod having a flattened surface portion extending in its longitudinal direction and said circular aperture in each bearing having a raised portion that fits said flattened portion on said support rod, said flattened portion being aligned with that one of the two locations at which, if the apertures are assumed to be round, in consequence of the oblique position thereof, the thickness of the bearing is a minimum and which is located at the end of the bearing opposite the flange.

2. The temple roller device according to claim 1 in which the oblique position of the bearings and the small wheels relative to the longitudinal axis of the support rod increases as to its degree of inclination in the direction away from the free end of said temple roller device towards the end serving for securing the temple roller device to the loom.

3. The temple roller device according to claim 1 in which all the flanges are disposed on identically located ends of their bearings and in that there is additionally provided at the end of said bearings serving for securing the temple roller device an end bearing having a flange, which is formed with an aperture in the same manner as said other bearings and the flange of which is located on that side of the end bearing which faces the free end of the temple roller device.

4. The temple roller device according to claim 3 in which said obliquely arranged bearings and flanges extend obliquely in such manner that in the zone of contact with the cloth they are more remote from the free end of the temple roller device than they are in their zone which is free from the cloth.

5. The temple roller device according to claim 3 in which each of said small wheels is arranged on a plastic sleeve, one sleeve applied on each bearing, and each sleeve has a lateral wall with the small wheel fitted thereon being disposed between the said lateral wall and the flange of the bearing.

6. The temple roller device according to claim 1 in which the apertures formed in the bearing and the flange have a raised portion corresponding to the flattened surface portion and adapted to bear over their entire periphery on said support rod.

* * * * *